D. F. BALL.
CATTLE GUARD.
APPLICATION FILED SEPT. 22, 1910.
995,943.
Patented June 20, 1911.
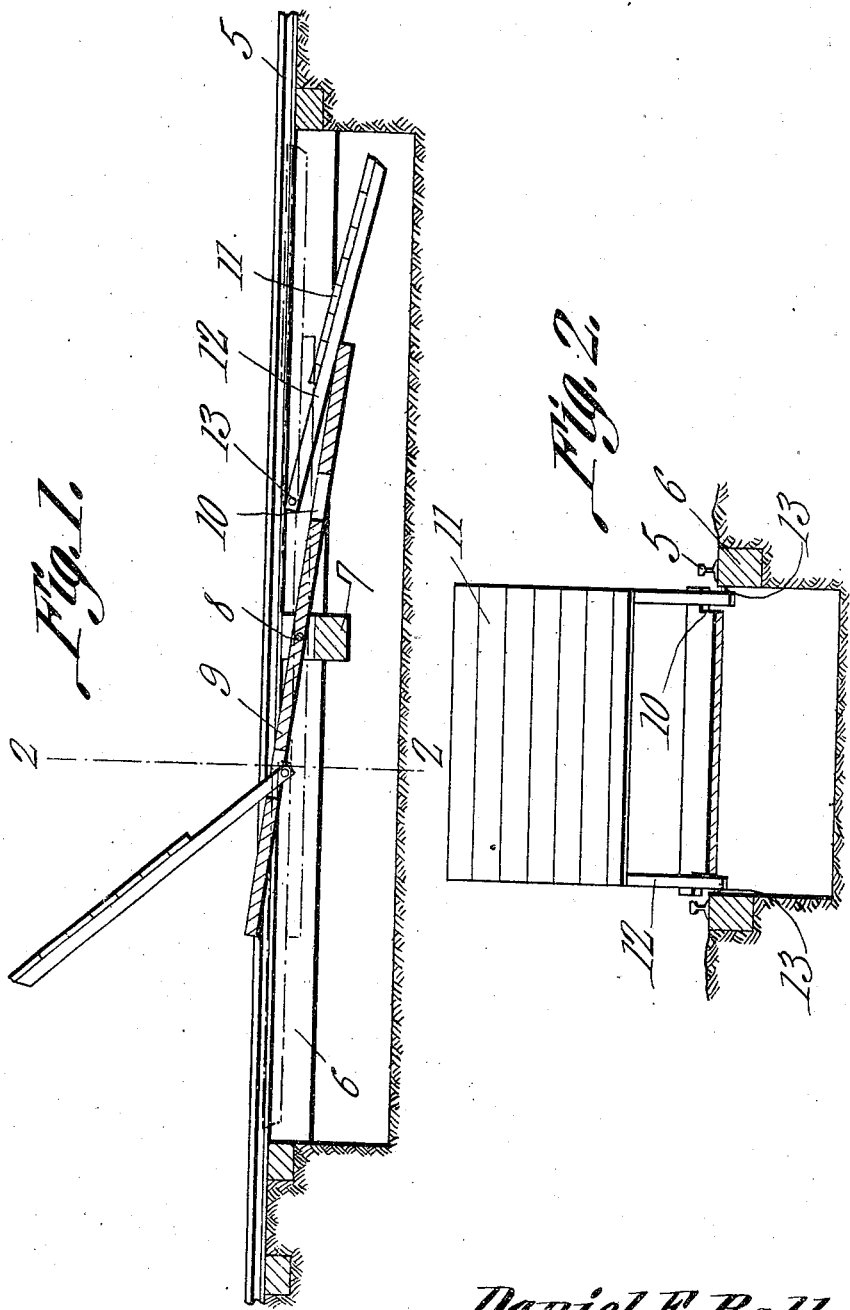
Witnesses
Daniel F. Ball,
Inventor
by C. A. Snow & Co.
Attorneys

UNITED STATES PATENT OFFICE.

DANIEL F. BALL, OF JEFFERSONTON, VIRGINIA, ASSIGNOR OF ONE-THIRD TO WILLIAM A. BALL, OF JEFFERSONTON, VIRGINIA.

CATTLE-GUARD.

995,943.　　　　　　Specification of Letters Patent.　　Patented June 20, 1911.

Application filed September 22, 1910. Serial No. 583,241.

*To all whom it may concern:*

Be it known that I, DANIEL F. BALL, a citizen of the United States, residing at Jeffersonton, in the county of Culpeper and State of Virginia, have invented a new and useful Cattle-Guard, of which the following is a specification.

It is the object of the present invention to provide an improved construction of cattle guard and the guard of the present invention is of that type in which a gate or obstruction is caused to swing up in front of an animal attempting to cross over the guard.

The present invention contemplates the provision, in a device of this general type, of an oscillatory base or platform and depressible gates or obstructions mounted for swinging movement above the platform and normally supported at about the same level as the platform, depression of either one of the gates by an animal stepping thereon serving to swing up the other gate and obstruct the passage over the guard.

With the above and other objects in view, the invention consists in the general construction and arrangement of parts shown in the accompanying drawings, in which, Figure 1 is vertical longitudinal sectional view through the guard constructed in accordance with the present invention, the same being shown positioned for use. Fig. 2 is a vertical transverse sectional view on the line 2—2 of Fig. 1.

In using the device it is arranged above a shallow pit dug in the ground in the manner illustrated, for example, in Fig. 1 of the drawings and in the said figure of the drawings there are shown ordinary rails 5 which extend over the pit and are preferably supported upon sills 6 extending one along each side of the pit. Extending transversely between and supported by the sills 6 is a beam 7 and mounted for oscillatory movement as at 8 upon this beam is a platform 9. The platform 9 is preferably of greater length than width and the axis upon which it oscillates is located transversely midway between the ends of the platform. For a purpose to be presently made clear, the platform 9 at each side edge at each side of its axis of oscillation is cut away as at 10.

In addition to the platform 9, the device embodies in its construction, two gates and each of these gates has a body portion 11 which may be made up of a number of boards as shown in the drawing or may be made up of bars arranged to form a frame, as may be desired. In either event, this portion 11 has secured to its under side at each side edge a standard 12, these standards being pivoted as at 13 to the adjacent sills 6, the gates being so arranged and mounted that the point of pivotal connection between the standards of one gate and the sill 6 will be located to one side of the axis of oscillation of the platform 9 and that of the other gate and the sill will be located to the other side of the said axis of oscillation. Also, these points of pivotal connection or support for the gates are so located that when the elements of the guard are in normal condition, that is when the platform 9 is level, both gates will be also level and in substantially the dotted line position shown in Fig. 1 of the drawings and in approximately the same horizontal plane as the said platform.

It will be observed that the standards 12 project inwardly beyond the inner edges of the portions 11 of the gate and that the inner portions of the gate overlap the ends of the platform 9 so that practically a flat and unbroken surface is presented between the track rails 5. Also it will be observed that the pivots 13 for the standards 12 are located above one of the cut away portions 10 of the platform when the platform is in normal position and that the standards 12 rest upon the upper side of the platform at the side edges thereof.

From the foregoing description of the invention it will be readily understood that should an animal, in an attempt to cross the guard, tread upon the gate to the right in Fig. 1 of the drawings, this gate will be depressed as will also the corresponding end of the platform 9, the left hand end of the platform in the said Fig. 1 being swung up to about the full line position shown in Fig. 1. This upward movement of the left hand end of the platform will result in the edges of the platform at the cutaway portion near the left hand edge thereof engaging beneath the standards of the left hand gate and this engagement is such as to cause the gate to be swung up as shown in full lines. It will be understood of course that should an animal attempt to cross the guard from left to right in the said figure this operation will be reversed and the right hand gate will be swung up.

What is claimed is:—

1. In a device of the class described, an oscillatory platform and a swinging gate mounted at each side of the axis of oscillation of the platform, said gate being depressible and having engagement with the platform whereby when either gate is depressed the other gate will be swung up.

2. In a device of the class described, an oscillatory platform, and a swinging gate mounted at each side of the axis of oscillation of the platform, said gate being normally in substantially the same plane as the platform and being depressible and having engagement with the platform whereby when either gate is depressed, the other gate will be swung up.

3. In a device of the class described, an oscillatory platform, said platform at the side edges being cut away at opposite sides of the axis of oscillation of the platform, a swinging gate mounted at each side of the axis of oscillation of the platform, each gate having standards arranged to coöperate with the edges of certain of the cut away portions of the platform when the platform is tilted in one direction, the gates being depressible whereby when either gate is depressed the other gate will be swung up.

In testimony that I claim the foregoing as my own, I have hereto affixed my signature in the presence of two witnesses.

DANIEL F. BALL.

Witnesses:
GEO. A. SUDDUTH,
S. Y. AMISS.

Copies of this patent may be obtained for five cents each, by addressing the "Commissioner of Patents, Washington, D. C."